United States Patent [19]

Kilgore et al.

[11] Patent Number: 5,415,441
[45] Date of Patent: May 16, 1995

[54] PUSH-ON COUPLING APPARATUS FOR TUBULAR WELL COMPLETION STRUCTURES

[75] Inventors: Marion D. Kilgore, Dallas; Colby M. Ross; Ralph H. Echols, III, both of Carrollton, all of Tex.

[73] Assignee: Halliburton Company, Houston, Tex.

[21] Appl. No.: 204,103

[22] Filed: Feb. 28, 1994

[51] Int. Cl.⁶ ............................................. F16L 21/06
[52] U.S. Cl. ................................... 285/322; 285/330
[58] Field of Search ............... 285/322, 323, 330, 421, 285/369, 333, 334, 355, 390; 294/86.1, 86.22, 86.26; 166/385

[56] References Cited

U.S. PATENT DOCUMENTS

| | | | |
|---|---|---|---|
| 3,502,353 | 3/1970 | Burns | 285/330 X |
| 3,701,550 | 10/1972 | Jacobson | 285/330 X |
| 4,616,855 | 10/1986 | Ruhle | 285/330 X |
| 4,682,657 | 7/1987 | Crawford | 166/385 |
| 5,238,273 | 8/1993 | Laflin et al. | 285/323 X |
| 5,306,050 | 4/1994 | Laflin et al. | 285/323 X |

FOREIGN PATENT DOCUMENTS

714971 8/1965 Canada ................................. 285/323

OTHER PUBLICATIONS

Bowen Tools, Inc., 1992–1993 General Catalog, pp. 14–16.

Primary Examiner—Dave W. Arola
Attorney, Agent, or Firm—Tracy W. Druce; J. Richard Konneker

[57] ABSTRACT

Using a specially designed push-on coupling structure the facing end portions of two tubular well completion structures, such as a length of coil tubing and a tubular coupling member, are fixedly and sealing connected to one another simply by pushing one of the end portions into the other end portions. The coupling structure includes an O-ring seal member carried by one of the end portions for creating a fluid tight seal between the telescoped end portions; a radial projection carried by one of the end portions and receivable in a side wall slot in the other end portion for preventing appreciable relative rotation between the telescoped end portions; and an axially split locking ring member coaxially threaded onto one of the end portions and having a gripping thread section disposed thereon and operative to engage the other end portion in a manner permitting the two end portions to be initially telescoped with one another but precluding their subsequent axial separation. This push-on coupling apparatus is representatively illustrated as being incorporated in a coil tubing splice member, on opposite ends of a tubular well completion device such as a landing nipple, and on a two piece push-together coupling structure used to operatively connect two tubular sand screen sections.

30 Claims, 5 Drawing Sheets

PUSH-ON COUPLING APPARATUS FOR TUBULAR WELL COMPLETION STRUCTURES

BACKGROUND OF THE INVENTION

The present invention generally relates to subterranean well completion apparatus and, in a preferred embodiment thereof, more particularly relates to coupling apparatus used to operatively interconnect various tubular well completion structures such as coil tubing sections, gas lift mandrels, packers, landing nipples and tubular sand screen sections.

In the fabrication of an well completion assembly using coil tubing, a required run of the coil tubing may be longer that the length of tubing carried on a supply reel. When this occurs, it is necessary to join two separate lengths of coil tubing together at facing end portions thereof. Because the two tubing lengths cannot conveniently be rotated relative to one another, the two conventional methods of connecting them are to weld them together or to connect them using swivel joints and lenz-type slip fittings. Because of fire hazards, the welding of coiled tubing at the rig site is considered highly undesirable, and quite often is not even permitted.

The swivel joint connection of two facing coil tubing ends requires that lenz-type slip fittings be secured to the facing tubing ends to provide them with connection thread areas. One end of the swivel joint is threadingly connected to one of the installed slip fittings and then rotated relative to the tubing lengths to threadingly connect the other end of the swivel joint to the other slip fitting. A similar coupling technique is used to connect various tubular well completion devices, such as landing nipples, packers, gas lift mandrels, circulating devices and tubular sand screen sections in an elongated overall length of coil tubing.

Over the length of a typical well completion assembly this conventional coupling technique tends to be a tedious, labor intensive, and therefore relatively expensive undertaking involving the use of numerous swivel joints and lenz-type slip fittings to connect the various tubular well completion devices between the corresponding sections of coil tubing, and to splice two lengths of coil tubing together where necessary. It can thus be seen that a need exists for improved apparatus for interconnecting facing end portions of coil tubing sections, and for operatively connecting tubular well completion devices in a length of coil tubing. It is accordingly an object of the present invention to provide such improved coupling apparatus.

SUMMARY OF THE INVENTION

In carrying out principles of the present invention, in accordance with preferred embodiments thereof, tubular well completion apparatus is provided that includes a first tubular well completion structure having a first end portion, and a second tubular well completion structure having a second end portion telescopingly received in the first end portion. The first and second tubular well completion structures are operatively interconnected using a specially designed push-on coupling structure embodying principles of the present invention.

The push-on coupling structure includes sealing means, anti-rotation means, and locking means. The sealing means are carried by one of the first and second well completion structure end portions and are operative to create a fluid tight seal between the first and second end portions in response to axial insertion of the second end portion into the first end portion. The anti-rotation means include cooperatively engaged means on the first and second end portions for preventing appreciable relative rotation therebetween. The locking means are carried by one of the first and second end portions and are operative to engage the other one of the first and second end portions in a manner permitting the second end portions to be axially inserted into the first end portion but precluding subsequent axial removal of the second end portion from the first end portion.

The push-on coupling apparatus of the present invention thus permits the first and second tubular well completion structures to be fixedly and sealing coupled to one another simply by axially inserting the second end portion of the second tubular well completion structure into the first end portion of the first tubular well completion structure. Unlike conventional coupling techniques, there is no need for welding, swivel joints or lenz-type slip fittings to effect the operative interconnection of the two well completion structures. The push-on coupling apparatus of the present invention may be used to operatively connect coil tubing sections and other tubular well completion structures representatively including packers, landing nipples, well circulating devices, gas lift mandrels, sand screen sections, and tubing retrievable downhole safety valves.

In illustrated preferred embodiments of the push-on coupling apparatus the sealing means comprise at least one resilient 0-ring seal member coaxially carried on one of the first and second well completion structure end portions; the anti-rotation means comprise a side wall slot formed in one of the first and second end portions, and a radial projection formed on the other one of the first and second end portions and received in the side wall slot; and the locking means comprise an axially split locking ring member coaxially and threadingly secured to one of the first and second end portions and having a side wall thread section configured to engage the other one of first and second end portions in a manner permitting the second end portion to be axially inserted into the first end portion but subsequently preclude the axial removal of the inserted second end portion from the first end portion.

The locking ring member may be exteriorly mounted on the second end portion, or interiorly mounted on the first end portion. According to a feature of the invention the locking ring member is threaded onto its associated well completion structure end portion by means of intermeshed first and second side wall thread means formed on the locking member and the end portion and permitting a limited amount of axial movement of the locking member relative to the end portion, and a limited amount of radial expansion and contraction of the locking member. Third side wall thread means formed on the locking member operate to engage and lockingly grip the other well completion structure end portion.

The intermeshed first and second thread means permit the telescoped first and second tubular well completion structures to axially move a limited distance relative to one another between a first limit position in which the locking member may be radially deflected away from the end portion contacted by the third thread means, and a second limit position in which the locking member is radially forced toward such contacted end portion.

According to another aspect of the present invention, with the first and second tubular well completion structures in their second limit position a second axially split locking ring member externally carried on the second well completion structure may be axially moved into abutment with the first well completion structure to preclude movement of the first and second well completion structures back to their first limit position. The second locking member is lockingly held in this abutment position thereof by intermeshed ratchet thread sections formed on the second tubular well completion structure and the second locking member.

DETAILED DESCRIPTION

Figure 1:
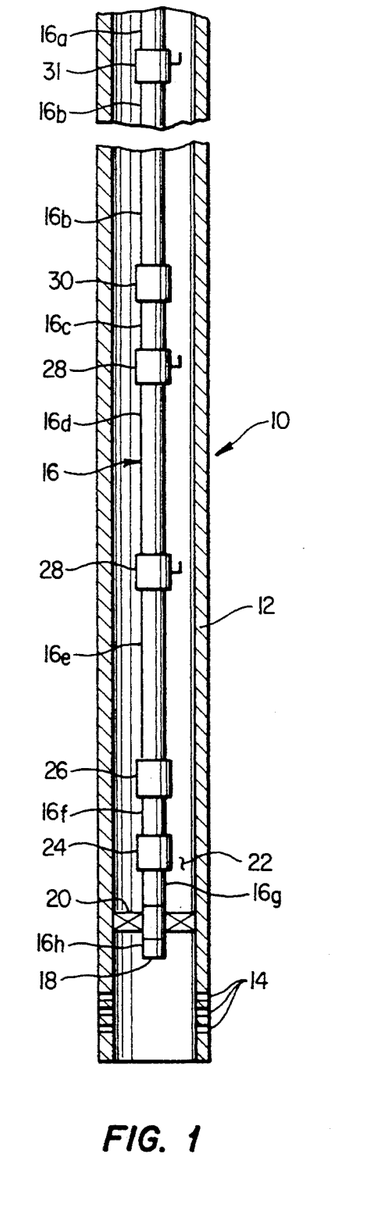
FIG. 1 is a schematic cross-sectional view, partly in elevation, through a representative well in which various tubular well completion devices are operatively connected in a length of coil tubing using specially designed push-on coupling apparatus embodying principles of the present invention.

Cross-sectionally illustrated in highly schematic form in FIG. 1 is a portion of a representative subterranean well completion 10 embodying principles of the present invention and including a tubular casing 12 extending vertically through the earth and having production fluid inflow perforations 14 formed in its lower end. Coil tubing 16, having an open lower end 18 and an outer diameter smaller than the inner diameter of the casing 12, extends downwardly through the casing 12 and is used to flow production fluid, entering the casing 12 through its perforations 14, upwardly to the surface. Operatively connected in the coil tubing 16, at vertical intervals therein, are various tubular well completion structures.

Representatively, these tubular well completion structures include a packer 20 connected at the lower end of the coil tubing and sealing off the casing annulus 22 above the packer; a landing nipple 24 disposed above the packer 20; a well circulating device 26 disposed above the landing nipple 24; a pair of gas lift mandrels 28 disposed above the circulating device 26; a tubular coupling splice member 30 disposed above the gas lift mandrels and joining longitudinal sections 16a,16b of the coil tubing 16 immediately above and below the coupling splice member 30, and a tubing retrievable downhole safety valve 31 disposed above the coupling splice member 30. The tubular well completion structures shown in FIG. 1 are connected in the coil tubing 16 between the indicated longitudinal sections 16a–16h thereof. For purposes of this description the longitudinal coil tubing sections 16a–16h are also considered to be encompassed in the term "tubular well completion structures".

According to a key aspect of the present invention, each of the representative tubular well completion structures 20–31 is connected to facing end portions of the coil tubing 16 simply by pushing such coil tubing end portions into their associated well completion structure. There is no need to form threads on the facing coil tubing end portions, to rotate the coil tubing to effect the connections, to rotate any of the structures 20–31 relative to the coil tubing, to perform any welding operations, or to use separate swivel joints or lenz-type slip fittings to effect any of the coil tubing/well completion structure connections.

Figure 2:
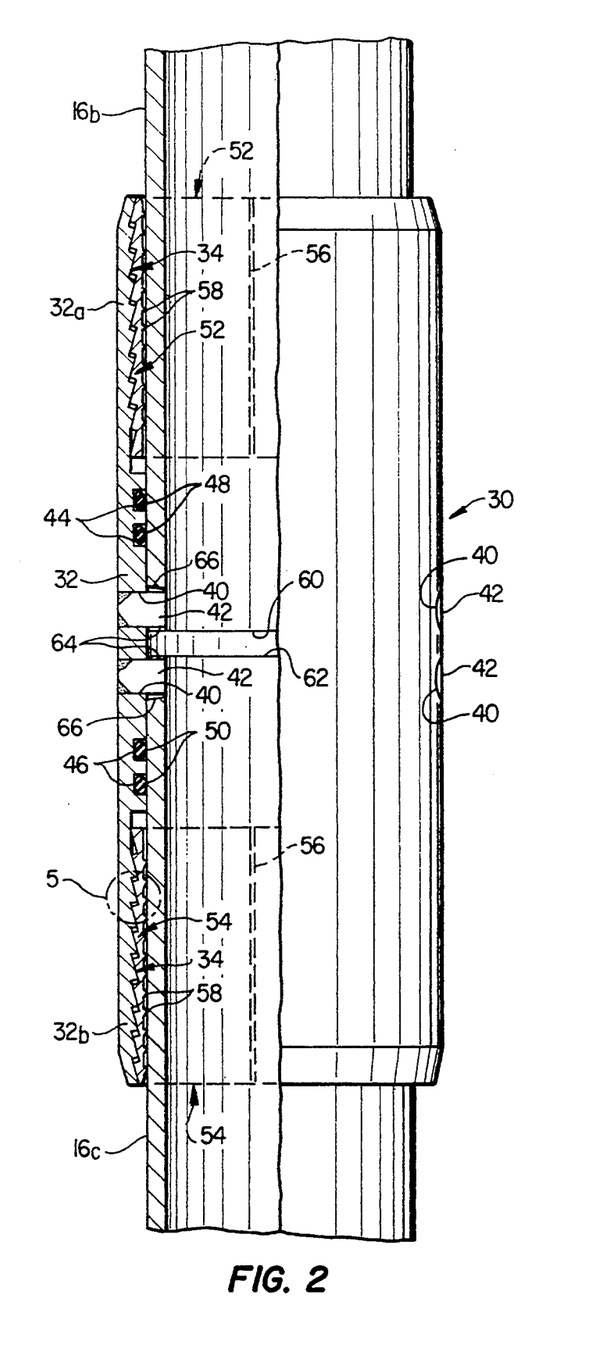
FIG. 2 is an enlarged scale quarter sectioned view through a push-on coupling device used to couple the facing end portions of the coil tubing shown in FIG. 1.
Figures 3, 4, 5A, 5B, 6, 8, 9:
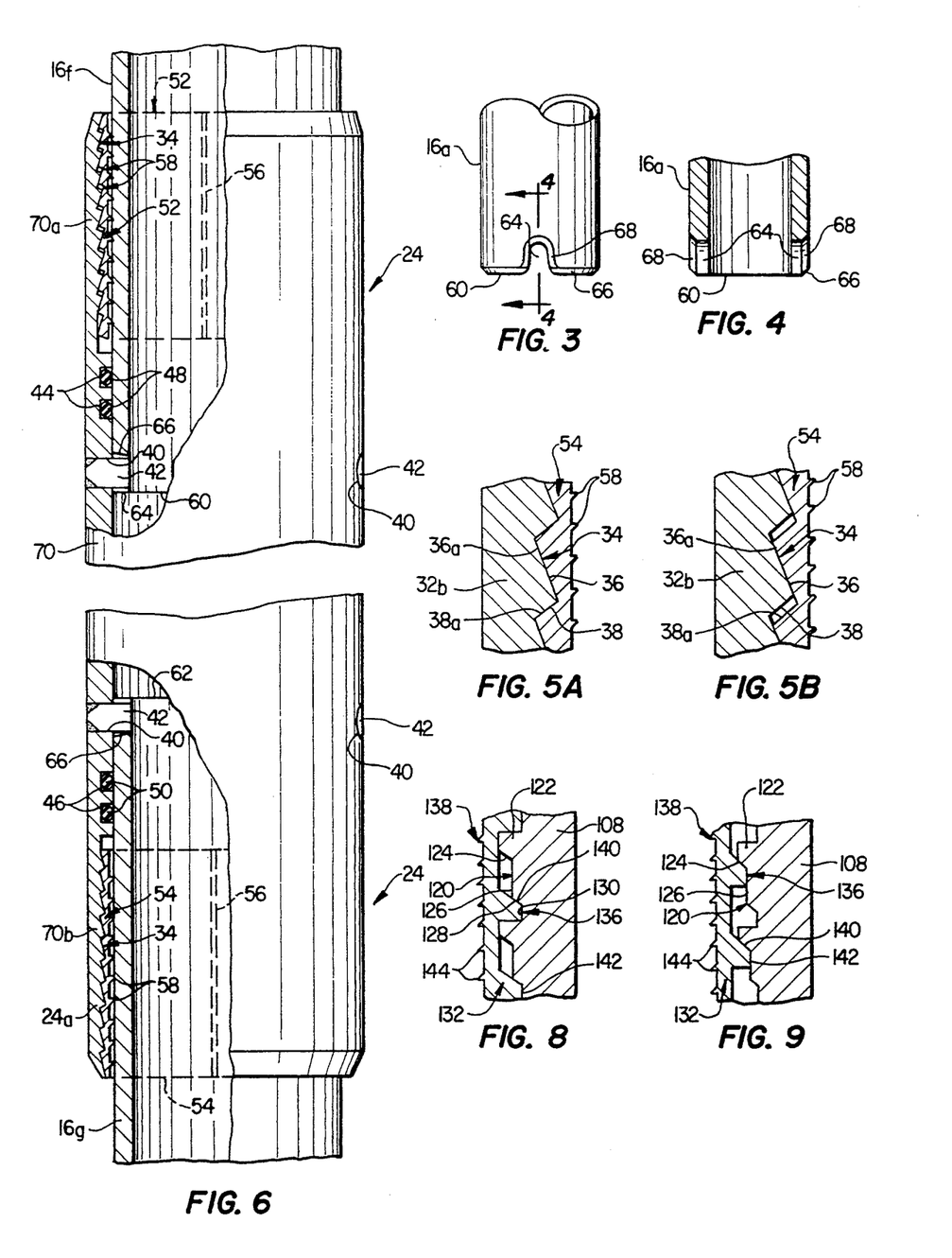
FIG. 3 is a reduced scale side elevational view of one of the facing COIL tubing end portions shown in FIG. 2.
FIG. 4 is a cross-sectional view through the coil tubing end portion taken along line 4—4 of FIG. 3.
FIGS. 5A and 5B are enlarged scale cross-sectional views of the circled area "5" shown in FIG. 2 and respectively illustrating a threaded slip ring portion of the coupling device in its expanded release position and its compressed locking position.
FIG. 6 is a longitudinally foreshortened, partially cut away view of a representative tubular well completion device having outer end portions modified in accordance with the present invention to form push-on coupling structures for connecting the device to facing coil tubing end portions.
FIGS. 8 and 9 are enlarged scale cross-sectional views of the circled areas "8" and "9", respectively, in FIGS. 7A and 7B and illustrate the operation of a threaded slip ring portion of the coupling device shown in FIGS. 7A and 7B.

Referring now to FIGS. 2–5B, the push-on coupling splice member 30 (see FIG. 2) has a hollow tubular body 32 with radially outwardly thinned open upper and lower end portions 32a and 32b. Each of the end portions 32a,32b is threaded, as at 34, on its interior side surface. The thread profile of threaded section 34 has a generally sawtoothed configuration, with each of the threads having an angled load bearing surface 36 and an oppositely angled expansion stop surface 38 as best illustrated in FIGS. 5A and 5B. Centrally disposed between the body end portions 32a,32b are two diametrically opposed pairs of axially spaced circular openings 40 extending radially through the body 32. Cylindrical metal stop pins 42 are received and welded within the openings 40 and have inner end portions that project inwardly beyond the interior side surface of the body 32. Alternatively, the stop pins 42 could be threaded into their associated body openings 40.

An axially spaced pair of annular grooves 44 are formed in the interior side surface of the body 32 between the uppermost openings 40 and the upper body end portion 32a, and an axially spaced pair of annular grooves 46 are formed in the interior side surface of the body 32 between the lowermost openings 40 and the lower body end portion 32b. The grooves 44 receive resilient O-ring seal members 48, and the grooves 46 receive resilient O-ring seal members 50.

Referring now to FIGS. 2, 5A and 5B, the tubular coupling splice member 30 also includes a pair of upper and lower metal C-ring locking members 52 and 54 that are respectively and threadingly received in the upper and lower end portions 32a,32b of the body 32. Each of the locking members 52,54 is axially split, as at 56, along its length and has external threads that are complementarily received in the interior threaded sections 34 on the upper and lower body end portions 32a,32b. Specifically, as illustrated in FIGS. 5A and 5B, each exterior thread on the lower C-ring locking member 54 has a generally sawtoothed configuration with an angled load bearing surface 36a and an oppositely angled expansion stop surface 38a. The upper C-ring locking member 52 has the same external thread configuration that is complementarily received in the internal threaded section of the upper body end portion 32a.

The interior side surface of each of the upper and lower C-ring locking members 52,54 has formed thereon a threaded section having relatively small width threads 58. On the upper locking member 52 the outer side edges of the interior threads 58 are sloped downwardly, while the outer side edges of the interior threads 58 on the lower locking member 54 slope upwardly. For purposes later described, the upper and lower C-ring locking members 52,54 are configured in such a manner that prior to the formation of the axial splits 56 therein the minimum diameter of their interior threads is slightly less than the outer diameter of the coil tubing 16. Stated in another manner, prior to the formation of the axial splits 56 in the C-ring locking members 52 and 54 there is an interference fit relationship between the threads 58 and the coil tubing 16.

In a manner which will now be described, the coupling splice member 32 is used to lockingly and sealing couple the coil tubing sections 16b,16c simply by pushing the open ends 60,62 of the tubing sections respectively into the open upper and lower end portions 32a,32b of the coupling splice member 32. Referring now to FIGS. 2-4, prior to this insertion of the coil tubing section 16a,16b into the coupling ends 32a,32b a diametrically opposed pair of axially inwardly extending slots 64 are formed in each of the coil tubing ends 60 and 62, each of the tubing section ends 60,62 is beveled as at 66, and the outer side of each of the slots 64 is inwardly beveled as at 68.

With the end slots 64 in the lower coil tubing section 16c circumferentially aligned with the lowermost pair of pins 42 the tubing section 16c is forced upwardly into the lower end portion 32b of the coupling body 32 until the lowermost pair of pins 42 enter the slots 64 in the tubing section 16c and bottom out against their inner ends as shown in FIG. 2. The upward entry of the tubing end portion 16c into the coupling end portion 32b in this manner seals the tubing end portion 16c within the coupling 30 by means of the two O-ring seal members 50 disposed on the inner side of the coupling. In a similar manner, the coil tubing section 16b is forced downwardly into the upper coupling end portion 32a to cause the uppermost pins 44 to enter and bottom out in the end slots 64 of the tubing section 16b and seal the inserted tubing section 16b within the coupling 30 by means of the two O-ring seal members 48. The end and slot bevels 66,68 on the inserted coil tubing sections 16b,16c prevent the tubing sections, during their entry into the coupling, from damaging the O-ring seals 48 and 50.

Prior to the upward insertion of the tubing section 16c into the lower coupling end portion 32b the lower C-ring locking member 54 is in its FIG. 5B position in which the locking member is in a radially relaxed state with its outer thread surfaces 38a being downwardly spaced apart from the facing thread surfaces 38 of the lower coupling end portion 32b. As the coil tubing section 16c is upwardly inserted into the lower coupling end portion 32b to the FIG. 2 position of the end portion 32b, the outer side surface of the tubing section 16c engages the interior locking member teeth 58, slides upwardly along the teeth 58, moves the locking member 54 upwardly relative to the lower coupling end portion 32b, and radially expands the locking member 54 to its FIG. 5A position in which the locking member thread surfaces 38a are brought into abutment with the facing thread surfaces 38 of the lower coupling end portion 32b.

After the tubing section 16c reaches its FIG. 2 inserted position within the coupling 30 the C-ring locking member 54 prevents axial removal of the tubing section 16b from the coupling due to the action of the upwardly sloping teeth 58 on the locking member 54 which bite into the outer side surface of the inserted portion of the tubing section 16c. Specifically, a downward force exerted on the inserted portion of the tubing section 16c pulls the locking member 54 downwardly to its FIG. 5B position in which the coupling thread surfaces 36 cam the locking member thread surfaces 36a inwardly, thereby radially compressing the locking member 54 against the inserted portion of the tubing section 16c and causing the upwardly sloping locking member teeth 58 to bite into the outer side surface of the inserted portion of tubing section 16b and prevent its withdrawal from the coupling 30.

Accordingly, an upper end portion of the coil tubing section 16c is quickly locked and sealed within the lower end portion 32b simply by pushing the tubing section into the coupling 30. The upper coil tubing section 16b is similarly locked and sealed in the upper end portion 32a of the coupling 30 simply by pushing the tubing section 16b into the upper coupling end portion 32a, thereby causing the teeth 58 of the upper C-ring locking member 52 to bite into the inserted portion of the tubing section 16b when an upward withdrawal force is exerted thereon.

Using this push-on coupling method of the present invention the previous necessity of using swivel joints and lenz-type slip fittings to couple the tubing sections 16b,16c is advantageously eliminated, and neither the coupling 30 nor either of the tubing sections 16b,16c needs to be rotated to effect this coupling.

While the coupling splice member 30 has been illustrated as having two pairs of diametrically opposed pins 42, and a corresponding number of tubing end slots, to prevent relative rotation between the coupling 30 and the tubing sections 16b and 16c it will readily be appreciated that a greater or lesser number of pins and associated tubing slots could be used as conditions dictate. Additionally, the pins 42 could be screwed into their associated coupling sidewall openings 40, or otherwise anchored therein, instead of being welded to the coupling 30. Moreover, if desired, the tube slots 64 could be spaced axially inwardly from the tube ends (i.e., without extending outwardly through the tube ends) and the pins screwed into the side wall openings 40 to enter these alternately positioned tube slots.

According to another aspect of the present invention, the opposite upper and lower connection ends of the other tubular well completion devices 20-28 and 31 representatively depicted in FIG. 1 are configured in a manner to the opposite ends of the coupling splice member 30 just described. This permits each device to be rapidly connected in the coil tubing 16 simply by pushing the open end portions of its associated coil tubing sections into the opposite connection ends of the particular device.

To representatively illustrate how the connection ends of each of the other tubular well completion devices 20–28 are configured to permit this push-on coupling technique the landing nipple 24 is shown in FIG. 6 in partially cut away, longitudinally foreshortened form. The open upper and lower end portions 70a,70b of the tubular body 70 of the landing nipple 24 have configurations identical to the upper and lower axial halves of the previously described connection splice member 30 illustrated in FIG. 2. Specifically, the upper and lower end portions 70a,70b are provided with the previously described internal thread sections 34 that threadingly receive the externally and internally threaded upper and lower C-ring locking members 52 and 54, the inwardly projecting anti-rotation pins 42, and the O-ring seal members 48 and 50.

Prior to the insertion of the coil tubing sections 16f and 16g into the upper and lower end portions 70a,70b of the landing nipple 24, diametrically opposed pairs of axially extending end slots 64 are formed in the open ends 60 and 62 of the tubing sections 16f and 16g, and the tubing section ends and the outer sides of the slots are respectively beveled at 66 and 68 as shown for the tubing section 16b in FIG. 3. After the operative insertion of the tubing sections 16f and 16g into the landing nipple 24, the locking member teeth 58 engage the inserted tube sections 16f,16g to prevent their axial withdrawal from the landing nipple, and the O-rings 48,50 seal the inserted tubing sections within the landing nipple.

Figure 7A:
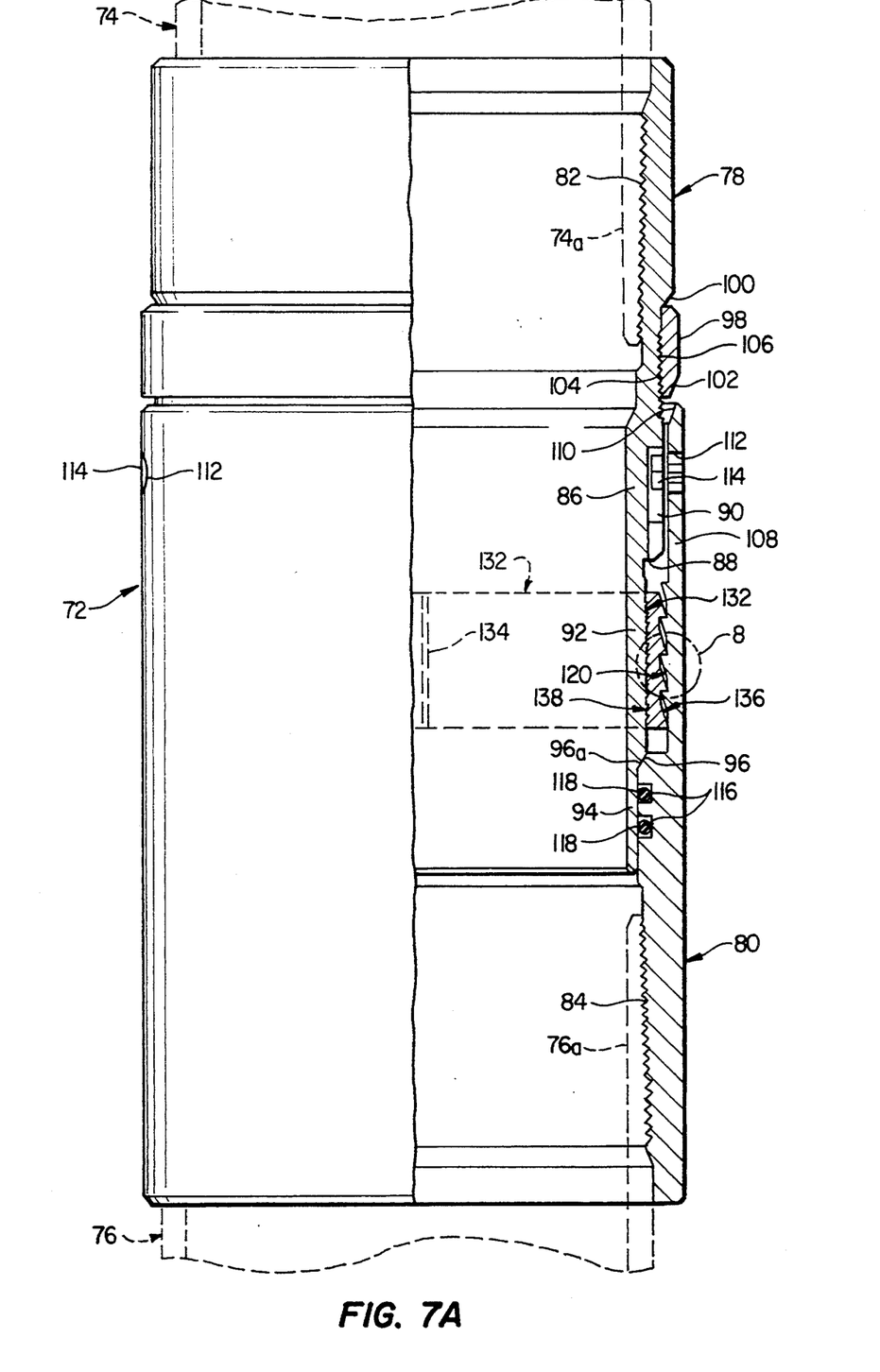
FIGS. 7A and 7B are quarter sectioned views through a push-on coupling device embodying principles of the present invention and used to operatively couple facing end portions of a pair of sand screen structures.
Figure 7B:
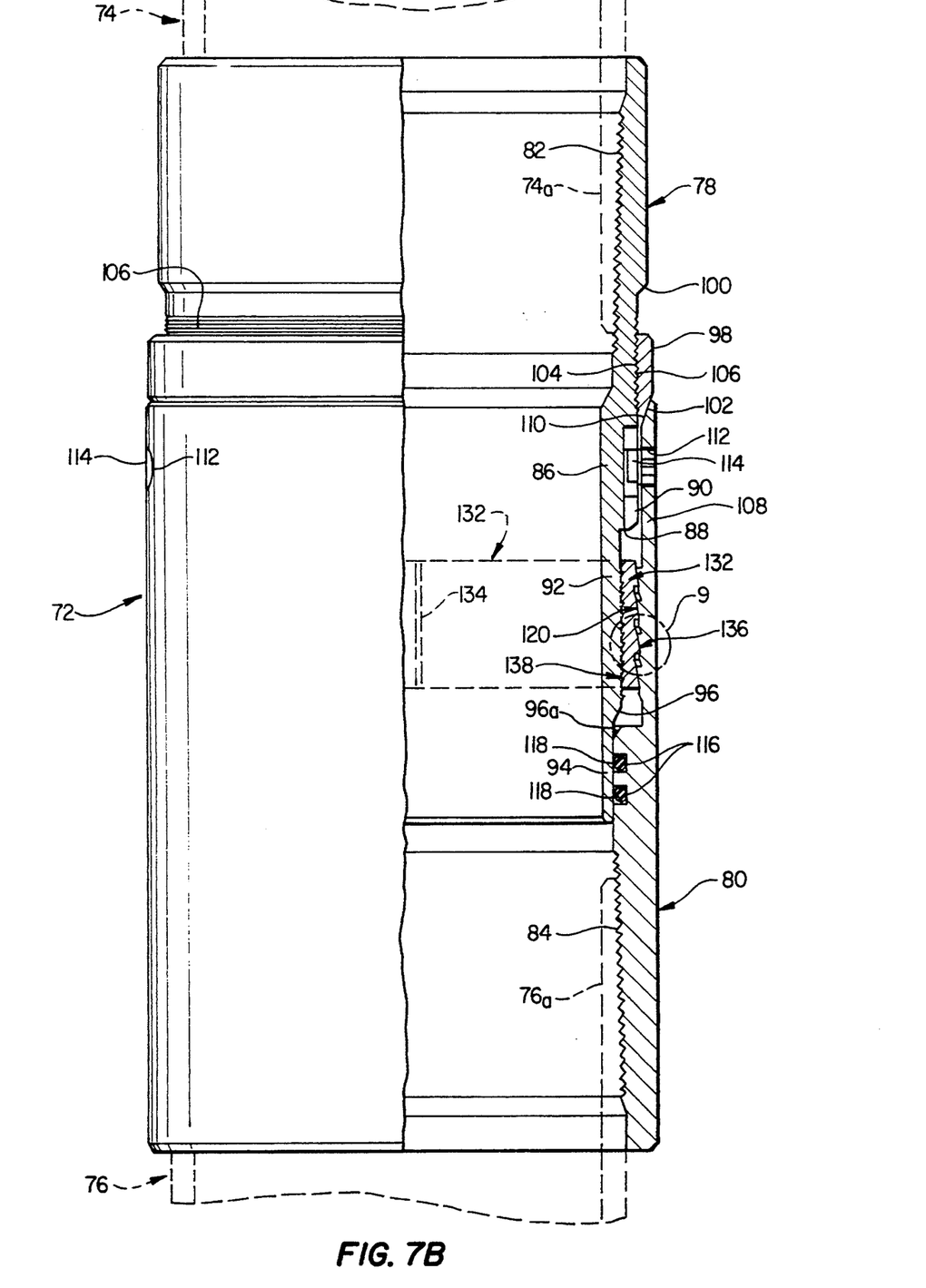

An alternate embodiment 72 of the previously described push-on coupling apparatus is shown in FIGS. 7A and 7B and is used to operatively connect the facing lower and upper end portions 74a and 74b of a pair of upper and lower tubular sand screen sections 74 and 76. The coupling structure 72 includes upper and lower tubular body portions 78 and 80. An upper end portion of the body portion 78 is internally threaded as at 82, and a lower end portion of the body portion 80 is internally threaded as at 84.

The upper body portion 78 has a longitudinally intermediate section 86 with a downwardly facing annular ledge 88 thereon. A diametrically opposite pair of axial slots 90 extend upwardly through the ledge 88 into the body section 86. Immediately below the body section 86 is a radially inwardly thinned body section 92 which is positioned above a still thinner lower end section 94 of the upper body portion 78. A downwardly and radially sloping annular exterior ledge 96 is disposed at the juncture of the body sections 92 and 94.

A split locking ring 98 outwardly circumscribes the upper body portion 78, is disposed above the upper ends of the slots 90 and below an annular exterior shoulder 100, and has an exteriorly beveled lower end portion 102. Cooperatively interengaged ratchet threads 104,106 are respectively formed on the inner side surface of the locking ring 98 and the exterior side surface of the upper body portion 78. The ratchet threads 104,106 are configured in a manner such that the locking ring can be moved downwardly along the body portion 78 from an upper limit position shown in FIG. 7A, in which the upper end of the locking ring 98 abuts the shoulder 100, to a lower limit position shown in FIG. 7B. Such downward movement of the locking ring 98 causes it to radially expand and contract as its interior teeth 104 ratchet over the teeth 106. However, for purposes later described, the interengaged teeth 104,106 are also configured to prevent subsequent upward movement of the locking ring 98 back toward its upper limit position.

The lower tubular body portion 80 has a radially outwardly thinned upper end portion 108 with an interiorly beveled upper end surface 110. Directly below the end surface 110 a diametrically opposed pair of threaded circular openings 112 are formed in the upper body end portion 108. A pair of metal anti-rotation pins 114 are threaded into the openings 112 and project inwardly beyond the inner side surface of the upper end portion 108. Disposed beneath the upper end portion 108 are a pair of annular grooves 116 formed in the inner side surface of the lower body portion 80, with a resilient O-ring seal member 118 being carried within each of the grooves 116.

Referring now to FIGS. 7A–9, an interior side surface thread section 120 is formed on the radially thinned upper end portion 108 of the lower body portion 80 between the pins 114 and the O-ring seals 118. As best illustrated in FIGS. 8 and 9, each annular thread in the thread section 120 has, from top to bottom, a radially inwardly projecting thread portion 122 with a vertically sloping load bearing surface 124 on its underside; an axially extending locking surface 126 which is radially inset from the outer side edge of the thread portion 122; a vertically sloping surface 128 extending downwardly from the lower side of the locking surface 126; and a radially inset annular expansion groove 130.

A C-ring locking member 132 is axially split, as at 134, and has a thread section 136 formed on its outer side surface, and a thread section 138 formed on its inner side surface. The locking member 132 is coaxially threaded into the upper end portion 108 of the body portion 80, with the locking member thread section being intermeshed with the thread section 120.

As best illustrated in FIGS. 8 and 9, each of the threads in the thread section 136 has an axially sloping annular upper side surface 140 which is parallel to the thread surfaces 124 in the thread section 120, and an axially extending outer side surface 142. The intermeshed thread sections 120 and 136 are relatively configured in a manner permitting limited axial movement of the locking member 132, relative to the body portion 80, between its FIG. 8 lower limit position and its FIG. 9 upper limit position. The relative configurations of the thread sections 120 and 136 further permit radial expansion of the locking member 132 from its FIG. 9 locked position to its FIG. 8 radially expanded position when, as later described herein, the locking member 132 is forced downwardly from its FIG. 9 position to its FIG. 8 position.

The thread section 138 formed on the inner side surface of the locking member 132 is defined by a series of relatively small, downwardly sloped threads 144 similar in configuration and operation to the locking member interior gripping threads 58 shown in FIGS. 5A and 5B. The locking member 132 is radially dimensioned in a manner such that, prior to the formation of the axial split 134 therein, the threads 144 have an interference fit relationship with the exterior side surface of the axial section 92 of the upper body portion 78.

Referring now to FIGS. 7A and 7B, with the upper and lower body portions 78 and 80 of the coupling structure 72 being initially separated from one another, the sand screen section end portions 74a and 76a are respectively threaded into the upper and lower coupling structure body portions 78 and 80 as illustrated. This step of the coupling procedure may be conveniently carried out at a suitable off-site location. At the well site the upper and lower sand screen sections 74 and 76 may subsequently be operatively coupled simply by circumferentially aligning the pins 114 with the slots 90 and then axially inserting the bottom end of the body portion 78 into the upper end of the body portion 80 until the annular exterior ledge 96 on the body portion 78 bottoms out against a corresponding interior annular ledge 96a on the lower body portion 80.

This axial insertion of the upper body portion 78 into the lower body portion 80 causes the pins 114 to enter the slots 90, thereby preventing relative rotation between the body portions 78 and 80, and also compresses the O-ring seal members 118 against the lower end section 94 of the upper body portion 78 to thereby seal the upper body portion 78 within the lower body portion 80.

Prior to this telescoping insertion of the upper body portion 78 into the lower body portion 80, the upper locking ring member 98 is in its FIG. 7A upper limit position, and the lower locking ring member 132 is in its FIG. 8 lower limit position or its FIG. 9 upper limit position. The downward passage of the upper body section 92 through the interior of the lower locking ring member 132 causes the outer side surface of the body section 92 to engage the locking member interior threads 144 in a manner driving the locking member 132 to its FIG. 8 lower limit position and radially expanding the locking member 132, as illustrated, while the body section 92 slides downwardly along the interior threads 144 until the upper body portion 78 bottoms out within the lower body portion 80 as illustrated in FIG. 7A.

To complete the coupling of the upper and lower sand screen sections 74 and 76 an axial separation force is appropriately exerted on the telescoped upper and lower coupling structure body portions 78 and 80. Because the interior locking member gripping teeth are configured to preclude upward movement of the body section 92 relative to the locking member 132 this axial separation force drives the locking member 132 upwardly from its FIG. 8 lower limit position to its FIG. 9 upper limit position. This, in turn, causes the exterior locking member threads to be withdrawn from the expansion grooves 130 in the coupling body thread section 120, the locking member thread surfaces 140 to abut the coupling body thread surfaces 124, and the locking member outer thread side surfaces 142 to be moved upwardly and radially inwardly onto the locking thread surfaces 126 as shown in FIG. 9.

The shifting of the thread surfaces 142 onto the thread surfaces 126 radially compresses the locking member 132, thereby causing the inner locking member threads 144 to firmly engage the outer side surface threads of the body section 92 and preventing the axial separation of the coupling structure body portions 78,80 from one another. By comparing FIGS. 8 and 9 it can be seen that when the locking member 132 is held in its FIG. 9 upper limit position the locking thread surfaces 126 engage the outer thread side surfaces 142 and prevent radial expansion of the outer side surface teeth on the locking member 132 into the expansion grooves 130 which would permit the locking member 132 from radially expanding and loosening the grip of its teeth 144 on the body section 92.

To hold the locking member 132 in its FIG. 9 upper limit position and prevent radial expansion of the lower locking member 132, the upper locking ring member 98 is forced downwardly along the upper body portion 78 until the beveled lower end 102 of the locking member 98 is brought into abutment with the beveled upper end 110 of the lower body portion 80 while an axial separation force is applied to sections 78 and 80 to hold the lock ring 132 in its upper limit position. As will be recalled, the intermeshed ratchet threads 104,106 on the locking member 98 and the upper body portion 78 prevent the upward movement of the locking member 98 along the upper body portion 78. Accordingly, the abutment of the locking member end portion 102 with the upper end 110 of the lower body portion 80 prevents the upper body portion 78 from moving downwardly relative to the lower body portion 80 as shown in FIG. 7B. This, in turn, prevents a downward return of the lower locking member 132 from its FIG. 9 upper limit/radially contracted position to its FIG. 8 lower limit/radially expanded position.

Figure 10:
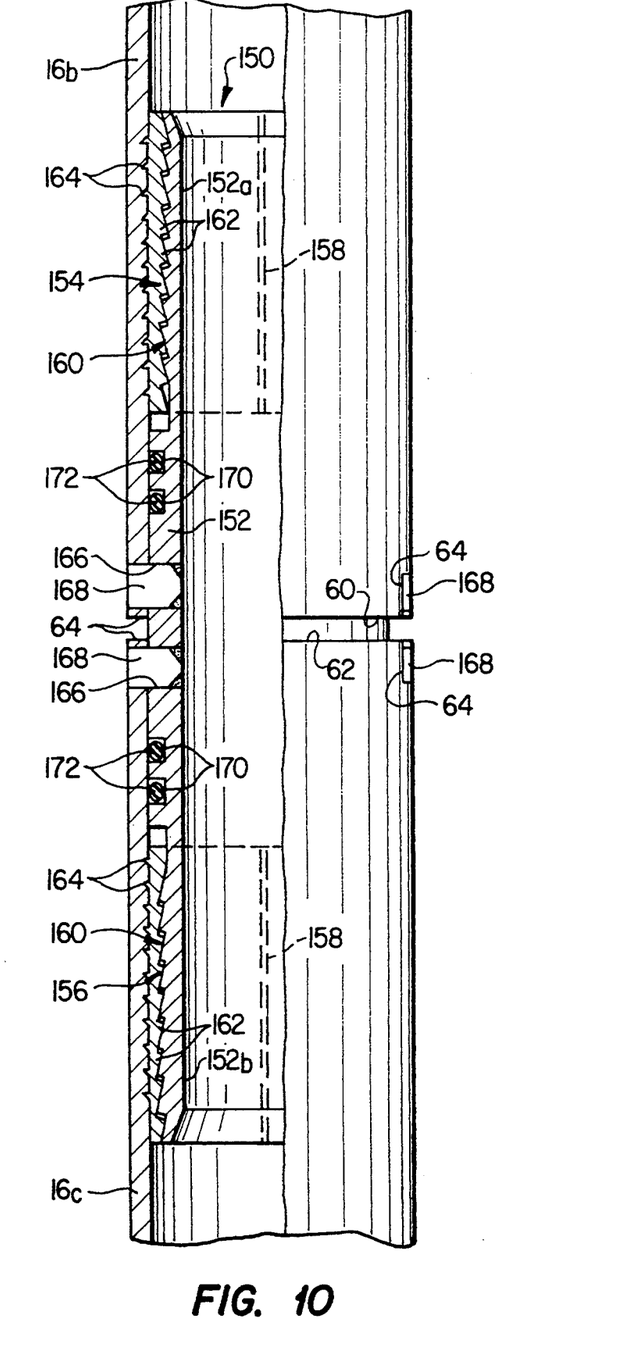
FIG. 10 is a quarter-sectioned view through an alternate embodiment of the push-on coupling device shown in FIG. 2.

An alternate embodiment 150 of the previously described coil tubing coupling splice 30 (FIG. 2) is illustrated in FIG. 10. Coupling splice 150 operates in the same manner as the coupling splice 30 except that its opposite ends are inserted into the open ends 60,62 of the coil tubing sections 16b,16c instead of the coil tubing section ends being inserted into the opposite ends of the coupling splice. This embodiment of the coupling splice offers the advantage that it does not project radially outwardly beyond the coil tubing sections that it operatively couples.

The coupling splice 150 has a generally tubular body 152 with radially inwardly thinned upper and lower open end portions 152a and 152b. Coaxially circumscribing the upper and lower end portions 152a,152b are upper and lower C-ring locking members 154 and 156 each being axially split as at 158. The exterior side surfaces of the upper and lower end portions 152a,152b have thread sections 160 formed thereon and having configurations similar to the locking member thread sections 34 shown in FIG. 2. The interior side surfaces of the locking members 154,156 have threads 162 formed thereon and having configurations similar to the external side surface threads on the FIG. 2 locking members 52 and 54. Threads 162 are intermeshed with the thread sections 160 in the same manner that the locking member exterior side surface threads are intermeshed with the body thread sections 34 in FIG. 2.

Series of small gripping threads 164 are formed on the exterior side surfaces of the upper and lower locking members 154,156 and are similar in configuration to the locking member gripping threads 58 shown in FIG. 2. The gripping threads 164 on the upper locking member 154 are downwardly sloped, and the gripping threads 164 on the lower locking member 156 are upwardly sloped.

Diametrically opposed pairs of side wall openings 166 are formed in the coupling body 152 between the locking members 154,156. Anti-rotation pins 168 are welded in the openings 166 and project radially outwardly beyond the body 152. Positioned between each pair of the pins 168 and the locking members 154,156 are a pair of annular exterior side surface grooves 170 that receive resilient O-ring seal members 172.

To operatively connect the coil tubing sections 16b,16c using the coupling splice 150 the upper pair of pins 168 are aligned with the end slots 64 in the upper tubing section 16b, and the upper end of the coupling splice if upwardly inserted into the upper tubing section 16b. As illustrated in FIG. 10, this causes the upper pair of pins 168 to enter the end slots 64 in the tubing section 16b, and seals the inserted portion of the coupling splice 150 within the tubing section 16b by means of the engagement of the two upper O-rings 174 with the interior side surface of the tubing section 16b.

In a similar manner, the lower end of the coupling splice 150 is inserted into the lower tubing section 16c to cause the lower pair of pins 168 to enter the end slots 64 on the lower tubing section 16c and seal the inserted coupling splice portion within the lower tube section 16c by means of the engagement of the lower O-ring seal members 172 with the interior side surface of the lower tubing section 16c. As the opposite end portions of the coupling splice 150 are inserted into the tubing sections 16b and 16c, the gripping threads 164 slidingly engage the interior side surfaces of the tubing sections and radially compress the locking rings 154 and 156. However, an axial separation force subsequently exerted on the tubing sections 16b and 16b, via the interaction between the locking member thread sections 160 and the locking member threads intermeshed therewith, causes the locking members 154,156 to radially expand, thereby forcing the gripping threads 164 into biting engagement with the interior side surfaces of the tubing sections 16b,16c and locking the tubing sections together.

It will be readily be appreciated that this alternate positioning of the locking means, seal means and anti-rotation means could also be used on the other coupling structures previously described herein. For example, in the landing nipple 24 shown in FIG. 6 (or any of the other tubular well completion structures 20,28,30 and 31 shown in FIG. 1) the upper and lower end portions thereof could be modified to exteriorly carry the locking members, the O-ring seals, and the anti-rotation pins, and to be insertable into the opposing coil tubing ends. Similarly, in the coupling structure 72 illustrated in FIGS. 7A and 7B the locking member 136, the O-ring seals 118, and the pins 114 could be exteriorly mounted on the body portion 78 instead of interiorly within the body portion 80.

The foregoing detailed description is to be clearly understood as being given by way of illustration and example only, the spirit and scope of the present invention being limited solely by the appended claims.

What is claimed is:

1. Tubular well completion apparatus comprising:
   a first tubular well completion structure having a first end portion;
   a second tubular well completion structure having a second end portion telescopingly received in said first end portion;
   sealing means, carried by one of said first and second end portions, for creating a fluid tight seal between said first and second end portions in response to axial insertion of said second end portion into said first end portion;
   cooperatively engaged means on said first and second end portions for preventing appreciable relative rotation therebetween; and
   locking means, carried by one of said first and second end portions, for engaging the other of said first and second end portions in a manner permitting said second end portion to be axially inserted into said first end portion but precluding subsequent axial removal of said second end portion from said first end portion said locking means including a split annular locking ring member coaxially and threadingly engaging the other one of said first and second end portions and grippingly engaging the other one of said first and second end portions,
   whereby said first and second tubular well completion structures may be fixedly and sealingly coupled to one another simply by axially inserting said second end portion into said first end portion.

2. The tubular well completion apparatus of claim 1 wherein said sealing means include:
   at least one resilient O-ring seal member coaxially carried on one of said first and second end portions.

3. The tubular well completion apparatus of claim 1 wherein said cooperatively engaged means include:
   a side wall slot formed in one of said first and second end portions, and
   a pin member transversely secured to the other of said first and second end portions and projecting into said side wall slot.

4. The tubular well completion apparatus of claim 1 wherein:
   one of said first and second well completion structures is a length of coil tubing.

5. The tubular well completion apparatus of claim 4 wherein:
   the other of said first and second tubular well completion structures is a tubular well completion device selected from the group consisting of packers, landing nipples, gas lift mandrels, well circulating devices, tubing retrievable downhole safety valves, and coil tubing splice structures.

6. Tubular well completion apparatus comprising:
   a first tubular well completion structure having a first end portion;
   a second tubular well completion structure having second end portion telescopingly received in said first end portion, said second end portion having an unthreaded exterior side surface;
   sealing means, carried by one of said first and second end portions, for creating a fluid tight seal between said first and second end portions in response to axial insertion of said second end portion into said first end portion;
   cooperatively engaged means on said first and second end portions for preventing appreciable relative rotation therebetween; and
   locking means, carried by one of said first and second end portions, for engaging the other of said first and second end portions in a manner permitting said second end portion to be axially inserted into said first end portion but precluding subsequent axial removal of said second end portion from said first end portion, said locking means including an axially split annular locking ring member coaxially threaded into said first end portion and circumscribing said unthreaded exterior side surface, said locking ring member having an interior side surface thread section forcibly engaging said unthreaded exterior side surface of said second end portion,
   whereby said first and second tubular well completion structures may be fixedly and sealingly coupled to one another simply by axially inserting said second end portion into said first end portion.

7. Tubular well completion apparatus comprising:
   a first tubular well completion structure having a first end portion having an unthreaded interior side surface;

a second tubular well completion structure having a second end portion telescopingly received in said first end portion;

sealing means, carried by one of said first and second end portions, for creating a fluid tight seal between said first and second end portions in response to axial insertion of said second end portion into said first end portion;

cooperatively engaged means on said first and second end portions for preventing appreciable relative rotation therebetween; and locking means, carried by one of said first and second end portions, for engaging the other of said first and second end portions in a manner permitting said second end portion to be axially inserted into said first end portion but precluding subsequent axial removal of said second end portion from said first end portion, said locking means including an axially split annular locking ring member coaxially and exteriorly threaded onto said second end portion and having exterior side surface thread section forcibly engaging said unthreaded interior side surface of said first end portion, whereby said first and second tubular well completion structures may be fixedly and sealingly coupled to one another simply by axially inserting said second end portion into said first end portion.

8. Tubular well completion apparatus comprising:

first tubular well completion structure having a first end portion;

a second tubular well completion structure having a second end portion telescopingly received in said first end portion;

sealing means, carried by one of said first end second end portions, for creating a fluid tight seal between said first and second end portions in response to axial insertion of said second end portion into said first end portion;

cooperatively engaged means on said first and second end portions for preventing appreciable relative rotation therebetween; and locking means, carried by one of said first and second end portions for engaging the other of said first and second end portions in a manner permitting said second end portion to be axially inserted into said first end portion but precluding subsequent axial removal of said second end portion from said first end portion, said locking means including:

first thread means formed on the inner side surface of said first end portion, and an axially split annular locking ring member coaxially disposed within said first end portion and circumscribing said second end portion, said locking ring member having an outer side surface with second thread means formed thereon and being intermeshed with said first thread means, and an inner side surface having third thread means disposed thereon and exteriorly engaging said second end portion, said first and second thread means being relatively configured in a manner permitting a limited axial movement of said locking ring member relative to said first end portion, and a limited amount of forced radial expansion of said locking ring member, and said third thread means being operative to be slidingly engaged by said second end portion, during its insertion into said first end portion, in a manner radially expanding said locking ring member, and further operative to grip and lock the inserted second end portion within the first end portion in response to an axial withdrawal force exerted on the inserted second end portion, whereby said first and second tubular well completion structures may be fixedly and sealingly coupled to one another simply by axially inserting said second end portion into said first end portion.

9. The tubular well completion apparatus of claim 8 wherein:

said first and second thread means each comprise a series of annular threads having generally sawtoothed configurations.

10. The tubular well completion apparatus of claim 8 wherein:

said first thread means comprise a series of annular threads each having a radially inwardly projecting side edge portion, a radially inset expansion groove axially spaced apart from said side edge portion, and an axially extending locking surface positioned between said side edge portion and said expansion groove and radially inset from said side edge portion, said second thread means comprise a series of annular threads each having a radially outwardly projecting side edge portion, said first and second thread means are relatively configured to permit axial movement of said second end portion relative to said first end portion between a first limit position in which said thread side edge portions of said second thread means are received in said expansion grooves with said locking ring member in a radially expanded position, and a second limit position in which said thread side edge portions of said second thread means radially abut said locking surfaces, and axially abut said thread side edge portions of said first thread means, with said locking ring member being in a radially contracted position, and said tubular well completion apparatus further comprises a second radially split annular locking ring member exteriorly threaded onto said second end portion and axially engageable with said first end portion in a manner precluding movement of said second end portion from said second limit position thereof to said first limit position thereof.

11. The tubular well completion apparatus of claim 10 wherein:

said second end portion and said second locking ring member have cooperatively intermeshed ratchet threads disposed thereon and operative to preclude axial movement of said second locking ring member out of abutment with said first end portion.

12. Tubular well completion apparatus comprising:

a first tubular well completion structure having a first end portion;

a second tubular well completion structure having a second end portion telscopingly received in said first end portion;

sealing means, carried by one of said first and second end portions, for creating a fluid tight seal between said first and second end portions in response to axial insertion of said second end portion into said first end portion;

cooperatively engaged means on said first and second end portions for preventing appreciable relative rotation therebetween; and locking means, carried by one of said first and second end portions, for engaging the other of said first and second end portions in a manner permitting said second end portion to be axially inserted into said first end portion but precluding subsequent axial removal of said second end portion from said first end portion, said locking means including:

first thread means formed on the outer side surface of said second end portion, and an axially split annular locking ring member coaxially disposed exteriorly on said second end portion, said locking ring member having an inner side surface with second thread means formed thereon and being intermeshed with said first thread means, and an outer side surface having third thread means disposed thereon and interiorly engaging said first end portion, said first and second thread means being relatively configured in a manner permitting a limited axial movement of said locking ring member relative to said first end portion, and a limited amount of forced radial expansion of said locking ring member, and said third thread means being operative to slidingly engage said first end portion, during insertion of said second end portion into said first end portion, in a manner radially contracting said locking ring member, and further operative to grip the interior side surface of said first end portion, and lock said second end portion within said first end portion, in response to an axial withdrawal force exerted on the inserted second end portion, whereby said first and second tubular well completion structure may be fixedly and sealing coupled to one another simply by axially inserting said second end portion into said first end portion.

13. The tubular well completion apparatus of claim 12 wherein:

said first and second thread means each comprise a series of annular threads having generally saw-toothed configurations.

14. The tubular well completion apparatus of claim 12 wherein:

said first thread means comprise a series of annular threads each having a radially inwardly projecting side edge portion, a radially inset expansion groove axially spaced apart from said side edge portion, and an axially extending locking surface positioned between said side edge portion and said expansion groove and radially inset from said side edge portion, said second thread means comprise a series of annular threads each having a radially outwardly projecting side edge portion, said first and second thread means are relatively configured to permit axial movement of said second end portion relative to said first end portion between a first limit position in which said thread side edge portions of said second thread means are received in said expansion grooves with said locking ring member in a radially expanded position, and a second limit position in which said thread side edge portions of said second thread means radially abut said locking surfaces, and axially abut said thread side edge portions of said first thread means, with said locking ring member being in a radially contracted position, and said tubular well completion apparatus further comprises a second radially split annular locking ring member exteriorly threaded onto said second end portion and axially engageable with said first end portion in a manner precluding movement of said second end portion from said second limit position thereof to said first limit position thereof.

15. The tubular well completion apparatus of claim 14 wherein:

said second end portion and said second locking ring member have cooperatively intermeshed ratchet threads disposed thereon and operative to preclude axial movement of said second locking ring member out of abutment with said first end portion.

16. A push-on tubular well completion structure connectable between facing unthreaded end portions of first and second lengths of tubing, said push-on tubular well completion structure comprising:

a hollow, generally tubular body having first and second end portions axially movable into telescoped relationships with the tubing end portions;

anti-rotation means carried by said body for engaging the tubing end portions and preventing rotation of said body relative thereto;

seal means carried by said body and operative to create a fluid tight seal between said body and the tubing end portions; and locking means carried by said first and second body end portions and being operative, in response to axial movement of said first and second body end portions into telescoped relationships with said tubing end portions, to preclude axial separation of said tubing end portions from said first and second body end portions, said locking means including split annular locking ring members coaxially and threadingly engaged with said first and second body end portions.

17. The push-on tubular well completion structure of claim 16 wherein said structure is a coupling splice useable to operatively couple facing end portions of first and second lengths of coil tubing.

18. The push-on tubular well completion structure of claim 16 wherein said structure is a tubular well completion device selected from the group consisting of packers, landing nipples, well circulating devices, gas lift mandrels, and tubing retrievable downhole safety valves.

19. The push-on tubular well completion structure of claim 16 wherein:

said first and second body end portions are configured to telescopingly receive the tubing end portions, and said locking ring members are internally threaded into said first and second body end portions and have interior side surfaces with gripping thread sections disposed thereon and operative to lockingly engage the outer side surfaces of the received tubing end portions.

20. The push-on tubular well completion structure of claim 16 wherein:

said first and second body end portions are configured to be telescopingly received in the tubing end portions, and said locking ring members are externally threaded onto said first and second body end portions and have exterior side surfaces with gripping thread sections disposed thereon and operative to lockingly engage the inner side surfaces of the tubing end portions.

21. The push-on tubular well completion structure of claim 16 wherein said anti-rotation means include a plurality of pin members transversely secured to said body.

22. The push-on tubular well completion structure of claim 21 wherein said plurality of pin members transversely project into the interior of said body.

23. The push-on tubular well completion structure of claim 21 wherein said plurality of pin members transversely project outwardly from the exterior of said body.

24. A push-together coupling structure for operatively coupling threaded end portions of a pair of tubular well completion structures, said push-together coupling structure comprising:
   a first generally tubular body portion having a first end portion threadingly securable to one of the well completion structure end portions, and a second end portion;
   a second generally tubular body portion having a first end portion threadingly securable to the other one of the well completion structure end portions, and a second end portion telescopingly insertable into said second end portion of said first body portion;
   sealing means, carried by one of said second end portions, for creating a fluid tight seal between said second end portions in response to insertion of said second end portion of said second body portion into said second end portion of said first body portion;
   cooperatively engageable anti-rotation means on said first and second body portions for preventing appreciable relative rotation thereof in response to insertion of said second end portion of said second body portion into said second end portion of said first body portion; and
   locking means, carried by one of said second end portions, for engaging the other of said second end portions in a manner permitting said second end portion of said second body portion to be axially inserted into said second end portion of said first body portion but precluding subsequent axial removal of said second end portion of said second body portion from said second end portion of said first body portion, said locking means including an axially split annular Locking ring member coaxially and threadingly secured to one of said second end portions and having a side surface with gripping threads disposed thereon and configured to grippingly engage the other of said second end portions in response to insertion of said second end portion of said second body portion into said second end portion of said first body portion,
   whereby said first and second body portions may be fixedly and sealingly coupled to one another simply by axially inserting said second end portion of said second body portion into said second end portion of said first body portion.

25. The push-together coupling structure of claim 24 wherein said sealing means include:
   at least one resilient O-ring seal member coaxially carried on one of said second end portions.

26. The push-together coupling structure of claim 24 wherein said cooperatively engageable anti-rotation means include:
   a side wall slot formed in one of said second end portions, and
   a radial projection formed on the other one of said second end portions and receivable in said side wall slot.

27. The push-together coupling structure of claim 24 wherein:
   said one of said second end portions has first thread means formed thereon, and
   said locking ring member has second thread means formed thereon and intermeshed with said first thread means,
   said first and second thread means being relatively configured in a manner permitting a limited axial movement of said locking ring member relative to said one of said second end portions, and a limited amount of forced radial expansion of said locking ring member.

28. The push-together coupling structure of claim 27 wherein:
   said first thread means comprise a series of annular threads each having a radially inwardly projecting side edge portion, a radially inset expansion groove axially spaced apart from said side edge portion, and an axially extending locking surface positioned between said side edge portion and said expansion groove and radially inset from said side edge portion,
   said second thread means comprise a series of annular threads each having a radially outwardly projecting side edge portion,
   said first and second thread means are relatively configured to permit axial movement of said second end portions relative to one another between a first limit position in which said thread side edge portions of said second thread means are received in said expansion grooves and a second limit position in which said thread side edge portions of said second thread means radially abut said locking surfaces, and axially abut said thread side edge portions of said first thread means.

29. The push-together coupling structure of claim 28 further comprising:
   a second radially split annular locking ring member exteriorly threaded onto the other one of said second end portions and axially engageable with said one of said second end portions in a manner precluding relative axial movement between said second end portions from said second limit position to said first limit position.

30. The push-together coupling structure of claim 29 wherein:
   said other one of said second end portions and said second locking ring member have cooperatively intermeshed ratchet threads disposed thereon and operative to preclude axial movement of said second locking ring member out of abutment with said one of said second end portions.

* * * * *